UNITED STATES PATENT OFFICE.

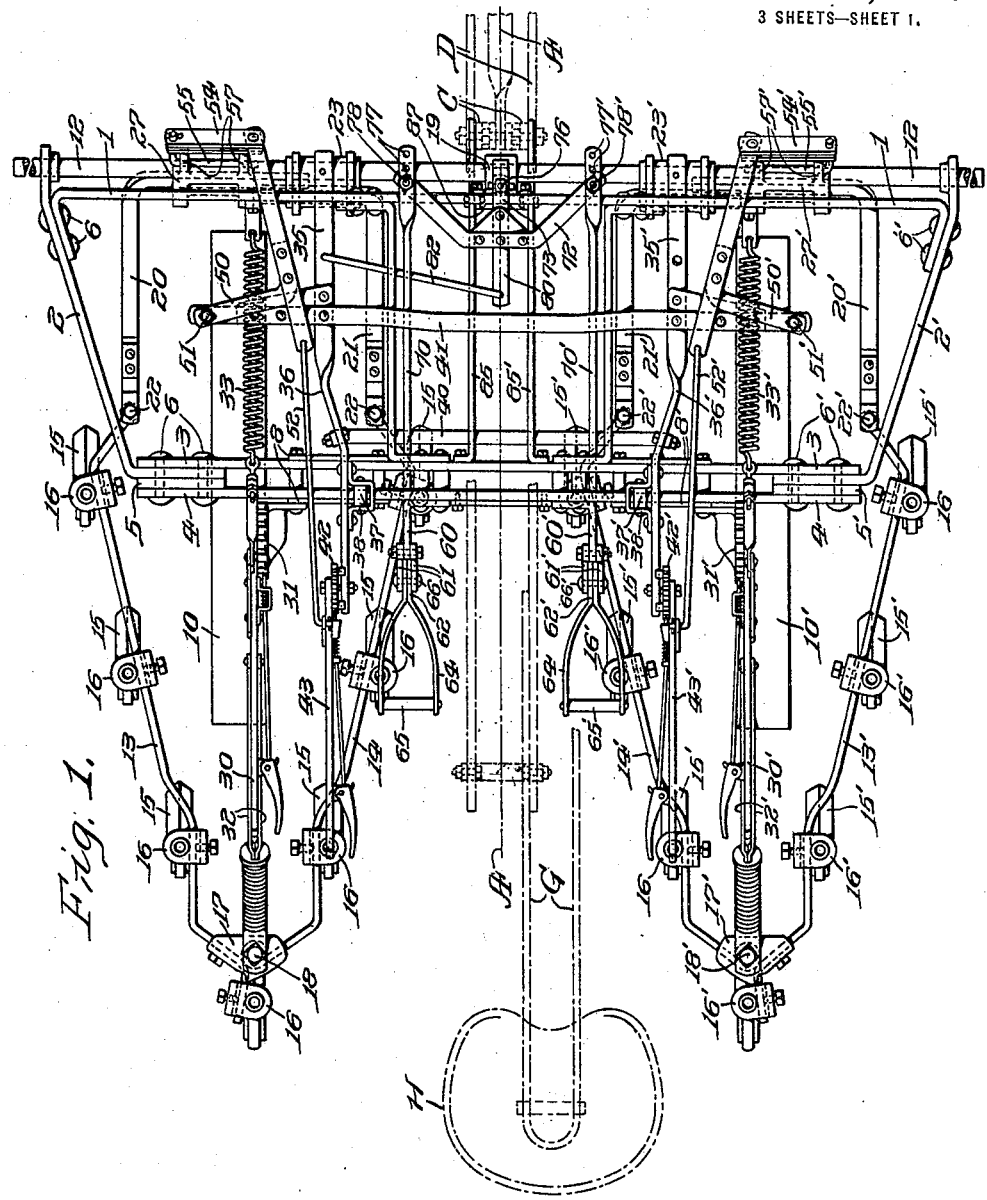

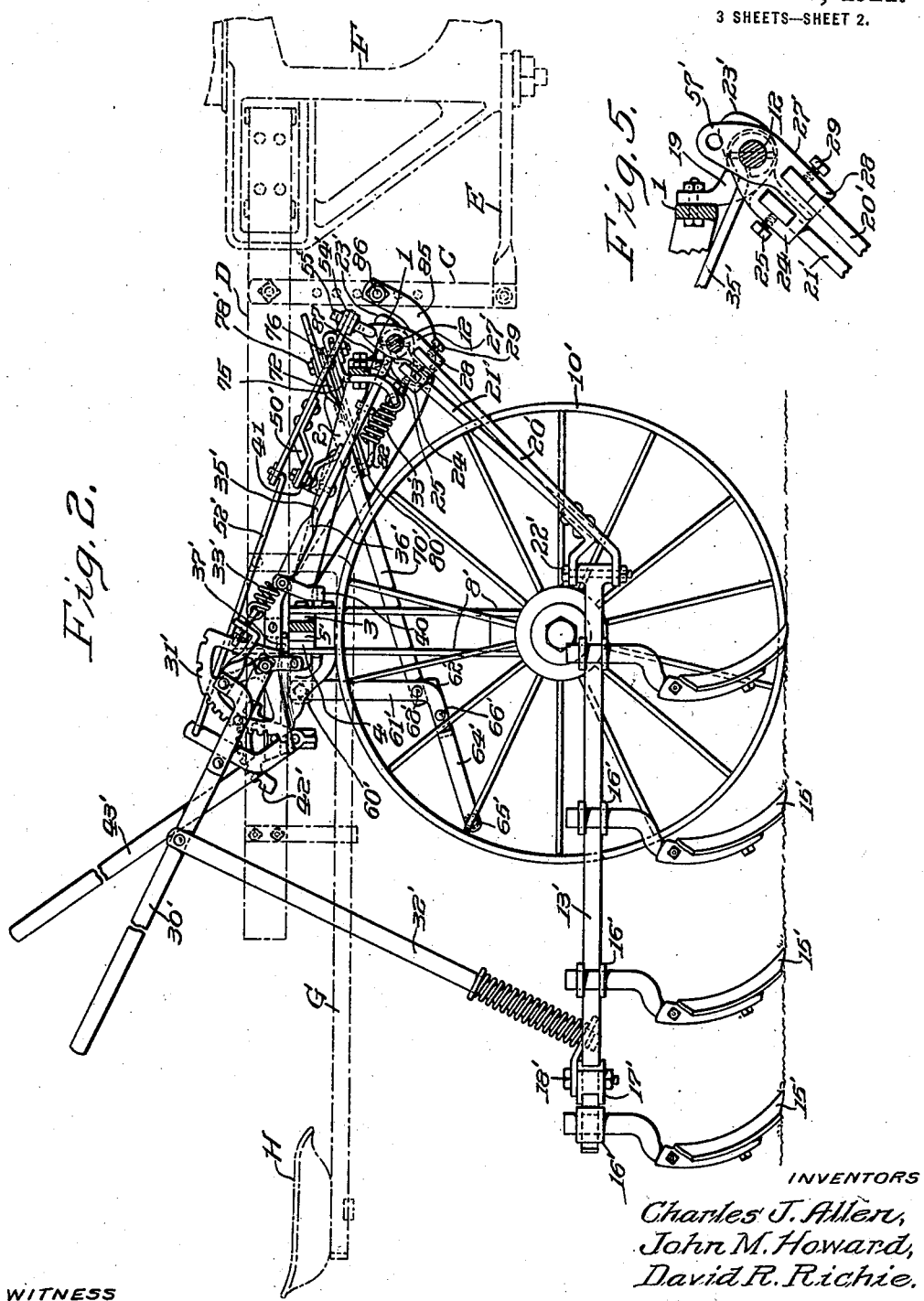

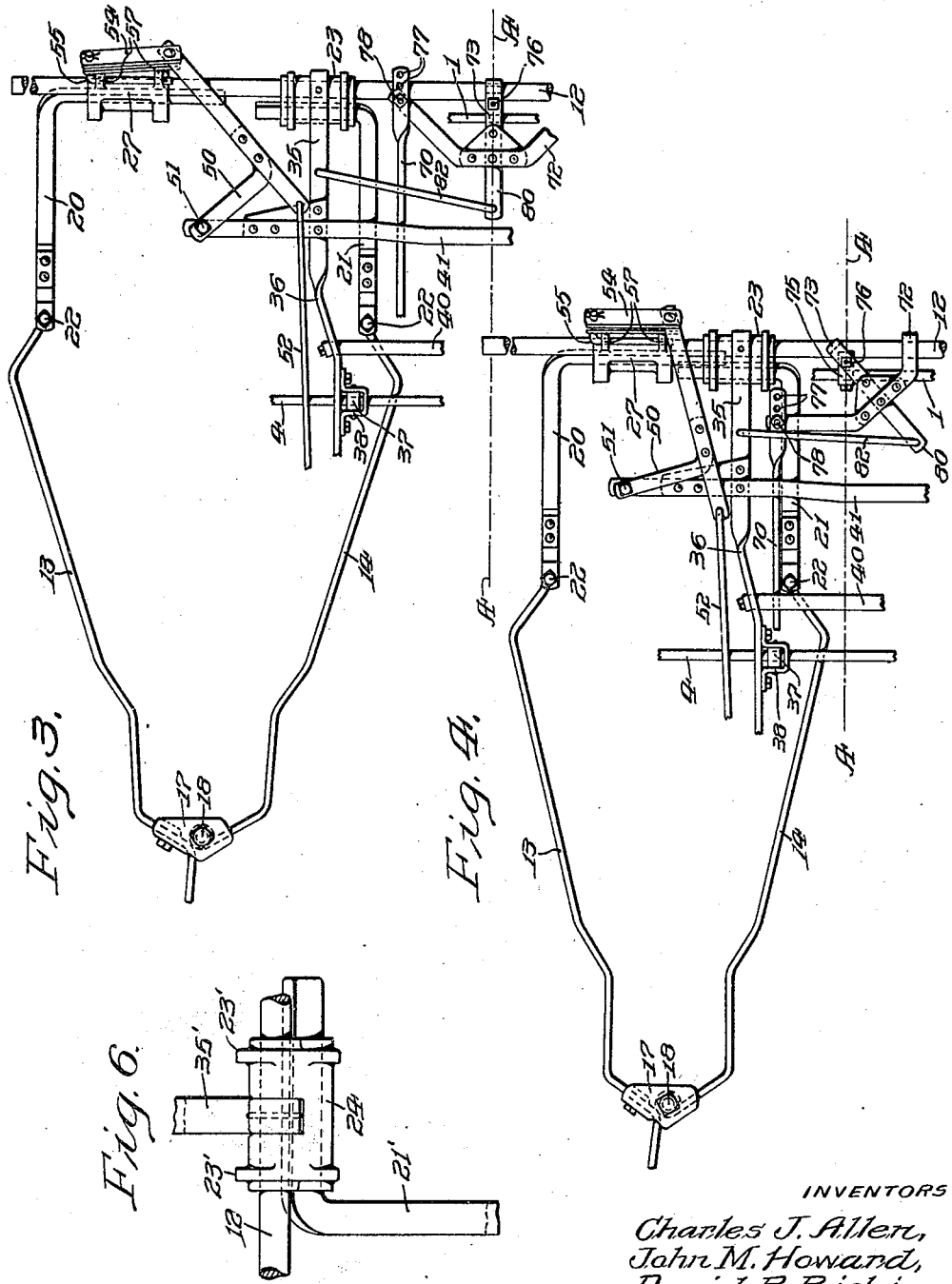

CHARLES J. ALLEN, OF MOORESTOWN, NEW JERSEY, AND JOHN M. HOWARD, OF MEDIA, AND DAVID R. RICHIE, OF LANSDOWNE, PENNSYLVANIA.

CULTIVATOR.

1,394,522.  Specification of Letters Patent.  Patented Oct. 25, 1921.

Application filed October 27, 1920. Serial No. 419,844.

*To all whom it may concern:*

Be it known that we, CHARLES J. ALLEN, JOHN M. HOWARD, and DAVID R. RICHIE, citizens of the United States, and residents, respectively, of Moorestown, county of Burlington, and State of New Jersey, Media, county of Delaware, and State of Pennsylvania, and Lansdowne, county of Delaware, and State of Pennsylvania, have invented certain new and useful Improvements in Cultivators, of which the following is a specification, reference being had to the accompanying drawings.

The invention relates to "two row" cultivators, that is, cultivators adapted for the cultivation of the ground adjacent three rows of plants, the cultivation being simultaneously performed on both sides of the center row and on the adjacent side of each of the two outer rows, and has for its principal object to provide a machine of this character particularly suitable for use in connection with a tractor. With this end in view the invention embodies the provision in a cultivator, of means under the control of the operator for increasing and decreasing the distance between the members of each tool carrying gang, means for raising and lowering the gangs and preferably foot controlled means whereby both gangs in any of their adjusted positions may be shifted to the right or left, so that by increasing and decreasing the distance between the members of each gang, the area covered by each gang may be regulated while the machine is in motion to suit the requirements of varying rows, while by suitable manipulation of the foot controlled means in combination therewith, the operator is enabled to cause the gangs to follow any sinuosities or curvatures in the rows without turning the tractor from its general direction of travel across the field.

Other objects of the invention comprise various improvements in the form and construction of cultivating machines of this general character designed to render the machine as a whole both simple and durable in construction and effective in operation, said improvements together with various other novel objects and features of construction and arrangement being hereinafter more particularly described and claimed.

While in carrying out the objects of the invention such instrumentalities and combinations thereof may be employed as are effective for accomplishing the results desired, in the accompanying drawings is shown a preferred embodiment of means particularly adapted for that purpose, and as the said form of the invention is more particularly intended for utilization in connection with a tractor, we have, in the said drawing, shown in broken lines such parts of a typical tractor as may be of assistance in obtaining a proper understanding of the invention. However, it is not thereby desired or intended to limit the employment of the improved cultivator with any particular form or type of tractor or other tractive means, as it may be utilized in connection with any motive power suitable for drawing it over the ground.

In the accompanying drawings, Figure 1 is a top plan view of a preferred embodiment of the invention showing the same operatively connected to a tractor beam; Fig. 2 is a side elevation of the machine shown in Fig. 1 partially in section and with certain parts removed for the sake of clearness; Figs. 3 and 4 are respectively more or less diagrammatic fragmentary top plan views of one of the gangs of the machine shown in Fig. 1, together with certain of the adjacent parts, Fig. 3 showing the positions assumed when the gang is opened out further than in Fig. 1, and Fig. 4 the positions assumed when the gang has been shifted to the right from the position shown in Fig. 1, the distance or width between the members of the gang being, however, unaltered from that shown in Fig. 1; Figs. 5 and 6 are enlarged fragmentary views showing certain details of the machine. Like numerals are used to designate the same parts in the several views, and as the machine is substantially symmetrical as regards its center line and comprises certain corresponding elements on opposite sides thereof, such elements have, as far as possible, been identically numbered with the addition of a prime (') where such element is on the right hand side of the machine.

Referring now more particularly to the drawings, the form of the invention shown therein comprises a main frame having a transversely extending front member 1, side members 2, 2' extending rearwardly therefrom and each preferably directed inwardly so as to assume a somewhat angular relation with the member 1. The side members are connected by the transversely extending rear frame members 3, 4, disposed in parallel relation with each other and preferably spaced apart by the interposition of the ends of the side frame members and the spacer blocks 5, 5', the various parts of the frame being suitably rigidly fastened together as by the rivets 6, 6'. The side members 2, 2' of the frame are also preferably inclined upwardly from the front member 1, so that, as best shown in Fig. 2, the latter in the assembled machine is positioned considerably below the level of the rear frame members 3, 4. Rigidly connected to the latter and depending downwardly therefrom on opposite sides of the center line A, A of the machine, are the axle supports 8 adjacent the lower extremities of which are mounted suitable stub axles carrying the ground wheels 10, 10' which serve to support the weight of the machine as it is drawn over the ground.

Positioned in advance of and preferably somewhat below the front frame member 1 is a supporting rod 12 which extends entirely across the front of the machine and is supported in any convenient manner, preferably by extending the side members 2, 2' forwardly and providing them with apertures forming bearings for the reception of ends of the rod, while a bracket 19 attached to the bar 1 adjacent its center and having an aperture for the passage of the rod, as best shown in Fig. 5, conveniently supports the latter near its middle point. The supporting rod is preferably arranged to slide laterally in its supports or bearings, and is effective to support, through suitable mechanism hereinafter described, the forward ends of the tool carrying gangs with which the cultivator is provided.

Each of these gangs comprises a pair of complementary members 13, 14, 13', 14' of suitable form, each of said members being preferably outwardly directed for a short distance adjacent its forward end, then inwardly directed or stepped, then directed substantially parallel with the center line of the machine, and finally directed sharply inwardly, so that when the tools 15, 15' are adjustably secured to the members by suitable clamps 16, 16' the tools are so disposed in offset relation one behind the other, as to effect the proper cultivation of a relatively large area. The members of each gang are suitably hinged together at their rearmost extremities, preferably through the medium of hinge plates 17, 17', and pivot bolts 18, 18', the general arrangement of the gangs and of the tools carried thereby being well understood by those familiar with the art.

For supporting the forward ends of the gangs from the supporting rod 12, suitable means are provided, which may comprise a plurality of L-shaped hangers 20, 20', 21, 21', each hanger having at its lower end a suitable yoke adapted to receive between its jaws a vertical boss formed on the end of the adjacent member of one of the gangs, a pivot bolt 22, 22' passing through the jaws of the yoke and the boss, serving to movably connect the parts together. In Fig. 2 the boss formed on the member 13' is clearly shown as well as its connection to the hanger 20'. From the yokes, each of the hangers may be directed angularly upward and forward and thence horizontally and parallel to the supporting rod 12 and so arranged that the horizontal portion of the hanger will lie beneath the rod. However, the precise form and arrangement of the hangers may be varied as desired, so long as the same are effective to afford support to the forward ends of the gang bars. Each of the hangers is adjustably supported from the supporting rod by suitable means, which, for example, may comprise with respect to the hangers 21, 21', a pair of sleeves 23, 23' positioned on the supporting rod, each having a depending boss 24, provided with a rectangular aperture through which the horizontal portion of the adjacent hanger is adapted to extend, a set screw 25 serving to secure the hanger in adjusted position with respect to the sleeve. A substantially similar arrangement may be employed for supporting the hangers 20, 20', sleeves 27, 27' having depending ears 28 with rectangular apertures for the passage of the horizontal portions of the hangers 20, 20' being provided and slidably positioned on the supporting rod, a set screw 29 being effective to secure the adjacent hanger in each of the sleeves. The horizontal portion of each hanger is preferably made of sufficient length to afford a considerable range of adjustment so that, when the sleeves are in any given position on the supporting rod, by suitable adjustment of the hangers in the sleeves, the angle between the members of each gang may be initially varied as desired.

The rear end of each gang is preferably adjustably supported through the medium of a hand lever 30, 30', each lever being pivoted to a bracket secured to the transverse frame members 3, 4, and being coöperative through a suitable latch with a quadrant 31 or 31'. Each lever is connected through a suitable link 32 or 32' with the rear end of the subjacent gang, so that by elevating and depressing the levers each of the gangs may be raised or lowered as desired. Counterbalance springs 33, 33' may be suitably interposed between each of the levers and brackets connected to the transverse frame member 1 for the purpose of counterbalancing to some extent the weight of the gangs when they are being raised.

Means preferably manually controlled and operated, and to be presently described, are provided for moving the sleeves 27, 27' along the supporting rod 12 so that during the operation of the cultivator the width of the gangs may be decreased or increased as desired independently of the position to which the members of the gangs may have been initially brought through the adjustment of the horizontal portions of the hangers in the sleeves, said means for manually altering the adjustment of the members of the gangs being intimately associated and coöperative with the foot operated mechanism for causing the simultaneous movement of both of the gangs to the right or left.

The sleeves 23, 23', are preferably cut away intermediate of their ends to receive the rearwardly extending bars 35, 35' which may conveniently be bent about the supporting rod and pinned or otherwise suitably secured thereto, so that, while each sleeve is prevented from endwise motion along the rod by reason of its engagement with the adjacent bar 35, 35', it is capable of movement around the supporting rod when required. Each of the bars is preferably given a twist through an angle of about 90° as at 36, 36' so as to bring the wider faces of the bars into the vertical plane, and are so directed upwardly and rearwardly, as best shown in Fig. 2, as to pass above the rear transverse frame members 3, 4, the bars, adjacent said members, being preferably bent to a horizontal position. For supporting the bars on the frame members and preferably on the member 4 alone, which thus serves as a supporting rail, each bar is provided with an anti-friction roller 37, 37' carried in a suitable clip 38, 38' secured to the bar, the roller being so positioned as to rest on the upper edge of the member 4 and transfer thereto the weight of the bars and their adjacent and connected parts. In order that the bars 35, 35' shall move unitarily they are suitably tied together, conveniently by means of a transversely extending tie bar 40 and also by another bar 41 which is riveted or otherwise secured to the bars 35, 35' substantially parallel to the supporting rod 12, this bar being of sufficient length to extend considerably beyond each of the bars 35, 35'. Conveniently this bar may be termed the fulcrum bar.

The bars 35, 35' are extended rearwardly of the transverse frame member or rail 4 and serve to support adjacent their rearmost extremities the quadrants 42, 42' which are coöperative with suitable latches carried by the hand levers 43, 43' pivoted adjacent the quadrants and extending rearwardly and upwardly to a position where they may be conveniently reached by the operator of the machine.

Interposed between the sleeves 27, 27' and the levers 43, 43' are suitable means for connecting the levers and the sleeves in such manner that movement of either lever will serve to move the sleeve to which it is respectively connected in and out along the supporting rod 12, thereby in turn moving the hangers 20, 20' to increase or decrease the distance between the members composing the gangs, in the form of the invention illustrated, said means comprising T-shaped or three-armed levers 50, 50'. One of the three arms of levers 50 is preferably offset so that its major portion will lie in a plane somewhat below that of the rest of the lever and is pivoted at 51 adjacent the right hand end of the fulcrum bar 41, another of its arms is connected by a link 52 with the lever 43, while the third arm which extends substantially forwardly is connected to one end of a link 54. This link may preferably be composed of a pair of complementary plates positioned one substantially above the other and adapted to receive between them at one end the arm of the lever 50, the other end of each plate being provided with an aperture adapted for the passage of a substantially vertically extending arm of a member 55 which may preferably be formed from a round rod of suitable size bent into L-shaped form. The other and longer arm of member 55 is positioned horizontally substantially parallel to the supporting rod 12 and is rotatably supported in a pair of ears 57 preferably integral with and directed upwardly from the sleeve 27, suitably disposed cotter pins or other fastening means being arranged to hold the member 55 in position in the ears and the plates of link 54 in position on the member. The various parts just described are preferably so arranged that the link 54 maintains a generally parallel relation with the supporting rod 12, the arm of the lever 50 which is connected to the link assumes an obtuse angular relation with respect to the link, and the arm which is connected to the fulcrum bar 41 a slightly angular relation with respect thereto, it being of course understood that the relation of the parts will vary somewhat in correspondence with the movement of the lever 43 by which they are actuated and controlled. It will further be understood that the lever 50' is connected adjacent the opposite end of the fulcrum bar 41 with the lever 43' and link 54' and that the latter is connected with the member 55' carried by sleeve 27' in a manner similar to that in which lever 50 is connected to the corresponding parts.

Suitably secured to any convenient portion of the main frame of the machine, for example, to the member or rail 4, are a pair of rearwardly extending brackets 60, 60', to which are horizontally pivoted the downwardly depending links 61, 61', each being preferably composed of a pair of complementary members located one on each side of the supporting bracket, each pair of members adjacent their lower ends being directed rearwardly for a short distance and receiving between them the forward end 62, 62' of the adjacent stirrup 64 or 64' as the case may be. Each stirrup preferably comprises a pair of complementary side members adapted to receive between their rearmost extremities the foot rests 65, 65' and drawn in at their front ends so as to contact with each other and engage between the members of the links to which they are secured by horizontal pivot bolts 66, 66', which pass through the lower ends of the members forming the adjacent link and through the stirrup, while extending forwardly from each of the links 61, 61' and connected thereto by a bolt 68 is another link 70, 70'. The rear end of each of these links 70, 70' is positioned above the forward part of the adjacent stirrup in such manner that when the rear end of the stirrup is depressed the forward end thereof will be forced against the under side of the link, as best shown in Fig. 2. The forward end of each of these links 70, 70' is connected to one of the arms of a substantially horizontally positioned yoke 72 having a central, forwardly projecting extension 73 pivoted preferably adjacent the frame member 1 and on the center line A A of the machine. The pivoting means for this yoke can be arranged in any suitable or convenient manner, preferably by providing a bracket 75 bolted to the frame member 1 and serving to support a pivot bolt 76 which passes through the extension 73 of the yoke, this extension being preferably doubled over on itself so as to receive a portion of the bracket, as best shown in Fig. 2. In order to provide means for adjusting the position of the stirrups the forward end of each of the links 70, 70' may preferably be provided with a plurality of holes 77, 77', for the reception of the pivot bolts 78 which secure them to the yoke so that by selecting a suitable hole for the passage of each of the bolts, the length of the links may be adjusted so as to bring the stirrups into different positions.

The yoke 72 is also provided with a rearwardly extending arm 80 preferably disposed centrally of the yoke, the extremity of which is connected by a suitable link 82 with one of the bars 35, or 35'.

It will be understood that it is requisite to provide suitable means for securing the implement to the tractor or other means employed for drawing it. While such connecting means may be of any suitable form, they may conveniently comprise a pair of forwardly and downwardly directed members 85, 85' rigidly secured at their rearmost extremities to the frame member 3 and curving upwardly adjacent their forward ends to meet the depending members C which are secured at their upper ends to the beam D of the tractor and at their lower ends, by a link E, to the yoke F thereof, members 85, 85' being attached to members C by a transversely extending bolt 86. For the purpose of making members 85, 85' more secure, a depending strap 87 is preferably provided and secured at its upper extremity to the frame member 1 and at its lower to the members 85, 85', although said members may be braced in any other suitable or convenient way. The tractor beam also preferably supports a rearwardly extending hanger G carrying the operator's seat H positioned so as to permit the operator to conveniently reach the various control levers of the implement and to rest his feet on the foot rests 65, 65' during operation.

In use under normal conditions the machine, having been coupled to a tractor and the tools 15, 15' suitably adjusted on the gangs, the latter may be lowered into operative position by suitable manipulation of the levers 30, 30'. Thereafter, during the operation of the machine, if it becomes necessary to increase or decrease the width of either of the gangs, the same can be easily accomplished by manipulation of the levers 43, 43', depending on which gang it is desired to control. Movement of lever 43, for example, is operative to cause movement of lever 50 about its point of attachment to fulcrum bar 41, whatever be the position of the latter and consequently movement of link 54 to shift sleeve 27 in or out along supporting rod 12, thereby moving hanger 20 to increase or decrease the width of the gang, it being understood that during these operations as sleeve 23 remains in relatively fixed position, member 14 is moved in correspondence with member 13 but for approximately only one-half the distance the member 13 moves. Hence, in the operation just described, the rear end of the gang will move a short distance to the right or left depending on whether the gang is being increased or decreased in width. The operation of certain of the parts and the positions assumed by them will be made more clear by reference to Fig. 3, in which the left hand gang controlled by lever 43 is shown, somewhat diagrammatically, after it has been opened out considerably from the position shown in Fig. 1. It will, of course, be understood that movement of the lever 43' is operative to effect adjustment of the gang on its side of the machine in a corresponding manner.

In the operation of the machine it is also frequently necessary or desirable to shift the gangs as a whole to the right or left in order to follow any curvature or sinuosity in the rows of plants, which movement is effected by suitable manipulation of the stirrups 64, 64', pressure on the former serving to shift both gangs to the left and pressure on the latter serving to shift them to the right. In effecting the latter movement, for example, the operator presses downwardly and forwardly on the foot rest 65′ which brings the forward end of the stirrup forcibly against the rear end of link 70′ and simultaneously swings the link 61′ forward about its pivot. The movement of the link 70′ serves to rotate yoke 72 about its pivot for an amount commensurate with the amount of movement of the stirrup; substantially maximum movement of the latter serving to swing the yoke to the position shown in Fig. 4. This movement of the yoke is effective through link 82 to draw the bar 35 to the right, carrying with it supporting rod 12, sleeve 23, lever 43, sleeve 27 and their connected parts, including of course the hangers 20 and 21 and attached gang, the corresponding parts on the opposite side of the machine being given a similar movement by reason of the fixed attachment of the fulcrum bar 41 to the bars 35, 35′. It will of course be understood that so long as the pressure is maintained on the foot rest 65′, the gangs will be retained in the position to which they have been shifted, and that upon a release of pressure on the foot rest 65′ and application of pressure to the rest 65 through the medium of the operator's left foot, the gangs may be brought back to central position or shifted to the left thereof, as may be desired. It will be further understood that the operation of shifting the gangs may be easily performed since the bars 35, 35′ during their movement are supported on the anti-friction rollers 37, 37′ traveling on the rail 4, while the supporting rod moves readily in its bearings, which may if desired be of any suitable anti-friction type.

It will be noted that while, for convenience, the operations of adjusting the width of the gangs and of shifting them to the right or left have been separately described herein, they may be, and frequently are, under operative conditions simultaneously performed, and that whatever be the position to which, through manipulation of the stirrups, the fulcrum bar 41 has been or is being brought, it nevertheless affords a suitable point of rotation for the levers 50, 50′ as they are moved to increase or diminish the width of the gang; furthermore, that as the links 54, 54′ are supported on the members 55, 55′ which are rotatable on a horizontal axis with respect to their adjacent sleeves 27, 27′ and as sleeves 23, 23′ are also freely rotatable about the supporting rod, the gangs and hangers 20, 20′, 21, 21′ may be freely raised and lowered by the levers 30, 30′ without disturbing the adjustment of, or cramping or binding the other portions of the machine, so that the various movements and operations necessary or desirable for effecting close, accurate and adequate cultivation of the rows of growing corn, beets or other plants may be effected easily and with the requisite precision.

While we have herein described with considerable particularity a preferred embodiment of our invention, we do not thereby desire or intend to limit ourselves solely thereto, as changes and modifications may be made in the form, construction and arrangement of the various parts, and the draft imparted to the gangs by means other than those specifically illustrated without departing from the spirit and scope of our invention as defined in the appended claims.

Having thus described the invention, we claim and desire to protect by Letters Patent of the United States:

1. In a cultivator, the combination with a frame, axles supported from said frame and wheels supported upon said axles, of a supporting rod extending adjacent said frame, a plurality of tool carrying gangs, means for supporting the forward ends of said gangs from said rod, means for supporting the rear ends of said gangs from said frame, a plurality of bars extending rearwardly from said rod and means connecting said bars in rigid relation, a hand lever supported on each of said bars, means connecting each of said levers with one of the tool carrying gangs, and foot controlled means operative to shift said bars, said levers and said gangs laterally.

2. In a cultivator, the combination with a frame, axles supported from said frame and wheels supported upon said axles, of a transversely extending supporting rod adjacent said frame, a plurality of tool carrying gangs comprising relatively movable members, a plurality of sleeves rotatable about said rod, means connecting each of said sleeves with one of the members of each of said gangs, a pair of rearwardly extending bars supported adjacent two of said sleeves, a transversely extending fulcrum bar connecting said rearwardly extending bars, a hand lever supported by each of said rearwardly extending bars, and means comprising a T-shaped lever fulcrumed on said fulcrum bar respectively connecting two other of said sleeves with their adjacent hand levers and operative to effect a movement of said last mentioned sleeves along said supporting rod in correspondence with the movement of said hand levers.

3. In a cultivator, the combination with a frame, axles supported from said frame and wheels supported upon said axles, of a transversely extending supporting rod adjacent said frame, a plurality of tool carrying gangs each comprising relatively movable members, a pair of sleeves movable about said supporting rod, a plurality of bars extending rearwardly from said supporting rod and operative to support a hand lever and a locking quadrant coöperative therewith a transversely extending fulcrum bar rigidly connecting said rearwardly extending bars and maintaining said bars in spaced relation, means connecting each of said sleeves with a member of each of said gangs, a second pair of sleeves slidable on said bar, means connecting each of said sleeves with the other member of each of said gangs, and means interposed between each of said levers and one of said second mentioned sleeves for moving said sleeves along said rod, said means comprising a three armed lever fulcrumed on said fulcrum bar and a link connecting one of the arms of said lever with the adjacent sleeve and movable in two directions with respect thereto.

4. The combination in a cultivator having a frame, wheels and means for supporting said frame on said wheels, of a plurality of tool carrying gangs having relatively movable members, a supporting rod positioned adjacent said frame, means supporting the forward ends of said gangs from said supporting rod comprising sleeves rotatable thereon and hangers extending from said sleeves to the members of the gangs, means for supporting the rear ends of said gangs from said frame, means for maintaining two of said sleeves in relatively fixed spaced relation comprising a pair of rearwardly extending bars and a fulcrum bar secured thereto, means for effecting a relative adjustment of the members of each of said gangs comprising a hand operated lever and a three armed lever pivoted on said fulcrum bar and connected with another of said sleeves, and means operative to shift said gangs and said adjusting means simultaneously to the right or left independently of the respective individual adjusted position of the members of each gang, said means comprising a yoke pivoted to said frame, means connecting said yoke with said rearwardly extending bars, and foot actuated means for moving said yoke about its pivot.

5. The combination in a cultivator, of a frame, a supporting rod adjacent said frame, a pair of tool carrying gangs each having independently movable members, means for supporting the rear ends of said gangs from said frame, a plurality of sleeves rotatable on said rod, means connecting said sleeves with the forward ends of the members of said gangs, a pair of bars respectively rearwardly extending from said rod, a fulcrum bar operative to hold said bars in fixed spaced relation, an operating lever carried by each of said bars, means comprising a three armed lever pivoted on said fulcrum bar connecting each of said operating levers with one of said sleeves, and means operative to simultaneously shift said bars and said rod laterally independently of the position of said operating levers.

6. The combination of a cultivator having a frame and a supporting rod adjacent thereto, of a gang having independently movable members, a sleeve on said rod and means connecting said sleeve with a member of said gang, a pair of bars rearwardly extending from said rod and slidably supported on said frame, a fulcrum bar connecting said bars, hand operated means including a lever pivoted on said fulcrum bar operative to move said sleeve in and out along said supporting bar to increase or decrease the distance between the members of the adjacent gang, and foot operated means adapted to simultaneously move said rod in either direction to effect lateral displacement of said gang.

7. In a cultivator the combination with a frame and a supporting rod adjacent thereto, of a pair of tool carrying gangs each comprising relatively movable members, a plurality of sleeves slidable on said rod and means connecting each of said sleeves with one of the members of each of said gangs, a pair of bars extending rearwardly from said rod and slidably supported on said frame, a transversely extending fulcrum bar maintaining said bars in fixed spaced relation, a hand lever carried by each of said bars, means connecting each of said hand levers with the slidable sleeve on its side of the machine and fulcrumed on said fulcrum bar, means operative to raise and lower each of said gangs and to rotate said sleeves on said supporting rod independently of the position of said connecting means, and foot controlled means operative to simultaneously shift said supporting rod to effect lateral displacement of said gangs independently of the adjusted position of said connecting means or the adjusted height of said gangs.

8. In a cultivator the combination of a frame, supporting means adjacent said frame, a tool carrying gang having relatively movable members, a sleeve slidable with respect to said supporting means, means connecting said sleeve with a member of said gang, a bar extending rearwardly from said rod and relatively movable with respect to said frame, means for maintaining said bar in relatively fixed position, and means for moving the sleeve relatively to said supporting means to effect relative adjustment of the members of the gang, said means comprising a three armed lever operative on a pivot relatively fixed with respect to said rearwardly extending bar.

9. In a cultivator the combination of a frame, a supporting rod, a tool carrying gang having relatively movable members, a sleeve slidable on said rod, means for connecting said sleeve with one of the members of said gang, a bar rearwardly extending from said rod, means for maintaining said bar in relatively fixed position, and means for moving the sleeve in and out along said rod to effect relative adjustment of the members of said gang, said means comprising a three armed lever operative on a pivot relatively fixed with respect to said rearwardly extending bar and a link movable in two directions with respect to said sleeve.

10. In a cultivator the combination with a frame, a supporting rod, a tool carrying gang having relatively movable members, a sleeve slidable on said rod, means for connecting said sleeve with one of the members of said gang, a bar rearwardly extending from said sleeve, means for maintaining said bar in relatively fixed position, and hand controlled means for moving the sleeve in and out along said rod to effect relative adjustment of the members of said gang, said means comprising a three armed lever operative on a pivot relatively fixed with respect to said rearwardly extending bar, a link movable in two directions with respect to said sleeve, and means for shifting said rod laterally independently of the adjusted position of the members of said gang.

In witness whereof, we have hereunto set our hands this 20th day of October, 1920.

CHARLES J. ALLEN.
JOHN M. HOWARD.
DAVID R. RICHIE.